United States Patent
Llorente Gonzalez

(10) Patent No.: US 7,476,985 B2
(45) Date of Patent: Jan. 13, 2009

(54) METHOD OF OPERATING A WIND TURBINE

(75) Inventor: Jose Ignacio Llorente Gonzalez, Zamudio (ES)

(73) Assignee: Gamesa Innovation & Technology, S.L., Pamplona (ES)

( * ) Notice: Subject to any disclaimer, the term of this patent is extended or adjusted under 35 U.S.C. 154(b) by 71 days.

(21) Appl. No.: 11/485,805

(22) Filed: Jul. 13, 2006

(65) Prior Publication Data

US 2007/0018457 A1 Jan. 25, 2007

(30) Foreign Application Priority Data

Jul. 22, 2005 (ES) .............................. P200501795

(51) Int. Cl.
*F03D 9/00* (2006.01)
*H02P 9/04* (2006.01)

(52) U.S. Cl. ........................................................ 290/44
(58) Field of Classification Search ................ 290/44
See application file for complete search history.

(56) References Cited

U.S. PATENT DOCUMENTS

| | | | | | |
|---|---|---|---|---|---|
| 2,926,348 | A | * | 2/1960 | Asquith ........................ | 342/75 |
| 4,111,601 | A | | 9/1978 | Richard ........................ | 416/41 |
| 4,160,170 | A | * | 7/1979 | Harner et al. ................ | 290/44 |
| 4,161,658 | A | * | 7/1979 | Patrick ........................ | 290/44 |
| 4,189,648 | A | * | 2/1980 | Harner ........................ | 290/44 |
| 4,193,005 | A | * | 3/1980 | Kos et al. .................... | 290/44 |
| 4,297,076 | A | * | 10/1981 | Donham et al. ............... | 416/37 |
| 4,334,775 | A | * | 6/1982 | Breecher et al. ....... | 356/139.03 |
| 4,420,692 | A | * | 12/1983 | Kos et al. .................... | 290/44 |
| 4,435,646 | A | * | 3/1984 | Coleman et al. ............. | 290/44 |
| 4,435,647 | A | * | 3/1984 | Harner et al. ................ | 290/44 |
| 4,490,093 | A | * | 12/1984 | Chertok et al. ............... | 416/26 |
| 4,692,095 | A | * | 9/1987 | Lawson-Tancred .......... | 416/23 |
| 4,703,189 | A | * | 10/1987 | DiValentin et al. ............ | 290/44 |
| 4,832,571 | A | * | 5/1989 | Carrol .................... | 416/132 B |
| 5,083,039 | A | * | 1/1992 | Richardson et al. ........... | 290/44 |
| 5,106,265 | A | * | 4/1992 | Holzem ....................... | 416/23 |
| 5,155,375 | A | * | 10/1992 | Holley ......................... | 290/44 |
| 5,289,041 | A | * | 2/1994 | Holley ......................... | 290/44 |
| 5,447,204 | A | * | 9/1995 | Asal et al. .................... | 172/821 |
| 5,570,859 | A | * | 11/1996 | Quandt ....................... | 244/213 |
| 5,652,485 | A | * | 7/1997 | Spiegel et al. ............... | 318/147 |
| 6,059,048 | A | * | 5/2000 | Subrt ........................ | 172/821 |
| 6,137,187 | A | * | 10/2000 | Mikhail et al. ................ | 290/44 |
| 6,247,540 | B1 | * | 6/2001 | Clemen et al. ............. | 172/818 |
| 6,265,785 | B1 | | 7/2001 | Cousineau et al. ............ | 290/44 |
| 6,273,198 | B1 | * | 8/2001 | Bauer et al. ................. | 172/825 |

(Continued)

FOREIGN PATENT DOCUMENTS

DE 195 32 409 A1 3/1997

(Continued)

*Primary Examiner*—J. Gonzalez
*Assistant Examiner*—Pedro J Cuevas
(74) *Attorney, Agent, or Firm*—Ladas and Parry LLP

(57) ABSTRACT

In a wind turbine and in a method of operating a wind turbine, the rotor speed and/or the generator power are reduced in response to variables exceeding predetermined values, the variables being one or more of wind direction relative to horizontal direction of main shaft of turbine, turbulence of the wind, or any other variable sensed by one or more sensors mounted on components of turbine.

7 Claims, 4 Drawing Sheets

U.S. PATENT DOCUMENTS

| | | | |
|---|---|---|---|
| 6,320,272 B1* | 11/2001 | Lading et al. | 290/44 |
| 6,420,795 B1* | 7/2002 | Mikhail et al. | 290/44 |
| 6,441,507 B1* | 8/2002 | Deering et al. | 290/44 |
| 6,600,240 B2* | 7/2003 | Mikhail et al. | 307/85 |
| 6,619,918 B1* | 9/2003 | Rebsdorf | 416/1 |
| 6,688,841 B1 | 2/2004 | Wobben | 415/1 |
| 6,703,718 B2* | 3/2004 | Calley et al. | 290/44 |
| 6,726,439 B2* | 4/2004 | Mikhail et al. | 415/4.1 |
| 6,749,399 B2* | 6/2004 | Heronemus | 416/41 |
| 6,809,431 B1 | 10/2004 | Schippmann | 290/55 |
| 6,847,128 B2* | 1/2005 | Mikhail et al. | 290/44 |
| 6,856,039 B2* | 2/2005 | Mikhail et al. | 290/44 |
| 6,890,152 B1* | 5/2005 | Thisted | 416/1 |
| 6,891,280 B2* | 5/2005 | Siegfriedsen | 290/44 |
| 6,909,198 B2* | 6/2005 | Ragwitz et al. | 290/44 |
| 6,940,185 B2* | 9/2005 | Andersen et al. | 290/44 |
| 6,955,229 B1* | 10/2005 | Hoffart | 172/811 |
| 7,042,110 B2* | 5/2006 | Mikhail et al. | 290/44 |
| 7,081,689 B2* | 7/2006 | Tilscher et al. | 290/44 |
| 7,086,834 B2* | 8/2006 | LeMieux | 416/1 |
| 7,118,338 B2* | 10/2006 | Moroz et al. | 416/1 |
| 7,268,443 B2* | 9/2007 | Kikuchi et al. | 290/44 |
| 7,317,260 B2* | 1/2008 | Wilson | 290/44 |
| 7,342,323 B2* | 3/2008 | Avagliano et al. | 290/55 |
| 7,352,076 B1* | 4/2008 | Gabrys | 290/44 |
| 7,420,289 B2* | 9/2008 | Wang et al. | 290/44 |
| 2002/0000723 A1* | 1/2002 | Weitkamp | 290/44 |
| 2002/0105189 A1* | 8/2002 | Mikhail et al. | 290/44 |
| 2003/0044274 A1* | 3/2003 | Deane et al. | 416/1 |
| 2003/0071467 A1* | 4/2003 | Calley et al. | 290/44 |
| 2003/0127862 A1* | 7/2003 | Weitkamp | 290/44 |
| 2003/0151260 A1* | 8/2003 | Siegfriedsen | 290/44 |
| 2003/0160457 A1* | 8/2003 | Ragwitz et al. | 290/44 |
| 2003/0165379 A1 | 9/2003 | Wobben | 415/1 |
| 2003/0170123 A1* | 9/2003 | Heronemus | 416/41 |
| 2004/0094964 A1* | 5/2004 | Mikhail et al. | 290/44 |
| 2004/0201220 A1* | 10/2004 | Andersen et al. | 290/44 |
| 2004/0207208 A1* | 10/2004 | Mikhail et al. | 290/44 |
| 2005/0012339 A1* | 1/2005 | Mikhail et al. | 290/44 |
| 2005/0042093 A1* | 2/2005 | Yoshida | 416/41 |
| 2005/0169755 A1* | 8/2005 | Yoshida | 416/132 B |
| 2005/0194787 A1* | 9/2005 | Tilscher et al. | 290/8 |
| 2005/0253396 A1* | 11/2005 | Mikhail et al. | 290/44 |
| 2005/0276696 A1* | 12/2005 | LeMieux | 416/61 |
| 2006/0002792 A1* | 1/2006 | Moroz et al. | 416/1 |
| 2006/0033338 A1* | 2/2006 | Wilson | 290/44 |
| 2006/0140761 A1* | 6/2006 | LeMieux | 416/61 |
| 2006/0214428 A1* | 9/2006 | Altemark et al. | 290/44 |
| 2006/0275121 A1* | 12/2006 | Merswolke et al. | 416/132 B |
| 2007/0075546 A1* | 4/2007 | Avagliano et al. | 290/44 |
| 2007/0086893 A1* | 4/2007 | Pedersen | 416/61 |
| 2007/0116572 A1* | 5/2007 | Barbu et al. | 416/132 B |
| 2007/0166147 A1* | 7/2007 | Merswolke et al. | 415/4.1 |
| 2007/0183885 A1* | 8/2007 | Ormel et al. | 415/4.1 |
| 2007/0205602 A1* | 9/2007 | Willey et al. | 290/44 |
| 2007/0216166 A1* | 9/2007 | Schubert | 290/55 |
| 2007/0231151 A1* | 10/2007 | Herr et al. | 416/229 A |
| 2008/0111379 A1* | 5/2008 | Altemark | 290/44 |
| 2008/0118342 A1* | 5/2008 | Seidel et al. | 415/1 |
| 2008/0124216 A1* | 5/2008 | Liao | 416/24 |
| 2008/0206052 A1* | 8/2008 | Volkmer | 416/61 |

FOREIGN PATENT DOCUMENTS

| | | |
|---|---|---|
| DE | 198 44 258 A1 | 3/2000 |
| EP | 1 013 925 A2 | 6/2000 |
| EP | 1 666 723 A1 | 7/2006 |
| WO | 97/09531 | 3/1997 |
| WO | 98/42980 | 10/1998 |
| WO | 00/77395 A1 | 12/2000 |
| WO | 01/33075 A1 | 5/2001 |
| WO | 01/86142 A1 | 11/2001 |
| WO | 2004/074681 A1 | 9/2004 |
| WO | 2005/026537 | 3/2005 |
| WO | 2006/032451 A1 | 3/2006 |

* cited by examiner

METHOD OF OPERATING A WIND TURBINE

The present invention relates to a method for operating a wind turbine in a safe mode, that is, operation of a wind turbine in such a way that safety is ensured while power output and availability are maximised. The invention relates as well to uses of the method and to a wind turbine designed for working the method.

Various unfavourable external conditions, mostly rough weather conditions, will cause excessive loads on wind turbines. On one hand, operating a wind turbine under such conditions should be avoided in order to avoid damaging stresses on the turbine, but on the other hand, stopping the wind turbine under such conditions will make the wind turbine unavailable and reduce energy production substantially, with consequent economical loss.

Some unfavourable "internal" conditions may result in excessive loads on the wind turbine as well. Such a condition would be a yaw error, that is, the yaw angle of the turbine is not aligned properly with the direction of the wind. A yaw error takes some time to eliminate as the yaw speed of a wind turbine is quite low, e.g. 0.5 deg/sec. A yaw error may thus persist for some time just as most of the unfavourable external conditions.

Other conditions where the wind turbine is improperly set or adjusted to the prevailing weather conditions may be regarded as "internal" conditions as well.

Some abnormal, internal conditions may reduce the safe maximum power or rotor speed level of the wind turbine. That is, under certain conditions, it may be unsafe to operate the wind turbine at rated power or speed, while it may be safe to operate the turbine at lower power or speed levels. Such conditions may e.g. be increased levels of noise, temperature or vibration.

Conditions like these will often call for service to be done at the wind turbine, but on the other hand, the turbine may likely be able to operate at reduced power or speed level while waiting for service work to be performed. Stopping the turbine under such conditions will then lead to unnecessary economical loss.

In the prior art, measures have been taken to address the problem of protecting wind turbines from overload, as well as related problems:

EP 847.496 discloses decreasing the power yielded by a wind turbine at wind speeds above a certain limit.

US 2002/723 discloses the use of various measuring means for obtaining an optimal economical efficiency by reducing the output power. It is mentioned that the turbine may be higher loaded in its younger years in order to increase pay-off and lower loaded in its elder years in order to prolong its service life (section 0025).

It is mentioned in section 0028 that "if the cost-of-energy values are higher than the maximum allowable cost-of-energy value determined by the efficiency model, the turbine will be brought to a standstill until more favourable conditions occur (e.g. lower turbulence or lower wind velocity)".

U.S. Pat. No. 4,339,666 discloses obtaining a safe operational mode based on measurements of pitch and torque.

DE 297 15 249 discloses control of maximum yaw and pitch torques measured at the tower, by means of setting of blade pitch angles.

DE 102 32 021 discloses prediction of wind gusts for the purpose of load reduction.

EP 998.634 discloses measurement means such as wind speed meters on the blades or load sensors in the hub for determining instantaneous mechanical load on the hub or the main shaft, and setting of blade pitch angle in dependency of measurement results therefrom. A divisional application EP 1.243.790 discloses measuring. instantaneous values of loads on parts of the turbine and continuous setting of the pitch of each blade in dependency of the measured variables.

EP 1.013.925 discloses measuring wind speed and wave height in an offshore wind turbine, calculating on this basis total values of loads on tower and foundation, and decreasing pitch angle in dependency of the loads.

EP 1.125.060 discloses decreasing rotary speed between a lower limit value and an upper limit value of the wind speed, the turbine being halted at wind speeds above the upper limit value.

EP 1.132.614 discloses decreasing the power in dependency of measuring variables such as rotary speed, power, torque, pitch, rate of pitch, wind speed, direction of wind, acceleration of machine parts, strain in machine parts and/or wind data in or ahead of the rotor plane, and formulating formulae for the load or impact on the turbine on the basis of the measurements.

JP 59 176,472 discloses setting pitch angle in dependency of the wind speed for the purpose of decreasing torque and improving safety.

JP 60 79,180 discloses detecting stress in the wings and setting of pitch angle in dependence thereof, for the purpose of ensuring that the stresses do not exceed a certain value.

U.S. Pat. No. 5,289,041 discloses decreasing rotary speed in dependence of wind speed and yaw angle error.

US 2004/108,729 discloses measuring acceleration of the tower for the purpose of enabling service of the turbine at reduced load in critical rotary speed intervals.

WO 01/66940 discloses decreasing the rotary speed to a desired rotary speed calculated from measurement or estimate of power or torque, and calculating corresponding rotary speeds.

The objective of the present invention is to protect the wind turbine from excessive loads stressing the structure and components of the turbine beyond a desired level, and at the same time to ensure that the wind turbine may even be operated in adverse weather conditions or in conditions of fault, error or reduced capacity, in order to maximise its production of energy.

According to the method of the invention, this objective is met in that the speed and/or power of the turbine are reduced (without stopping the wind turbine) when an unfavourable condition is detected, said condition potentially causing excessive load(s) on the turbine.

1. In more detail, the method comprises the step of reducing the rotor speed and/or the generator power in response to one or more variables exceeding predetermined value(s), whereby said variable(s) belong(s) to the group consisting of the wind direction relative to the horizontal direction of the main shaft of the turbine and the turbulence of the wind as sensed by external sensors, as well as any other variable(s) as sensed by one or more sensors mounted on components of the turbine and sensing a state of that component.

By these measures, it becomes possible to include a multitude of various variables in the basis for deciding whether to reduce the speed and/or power of the wind turbine, and thus to make the decision on better and broader grounds.

For example, if only the wind speed is monitored, a wind turbine of the prior art will generally be stopped at a wind speed of between 18 and 30 m/s; typically at a wind speed of 25 m/s. The damaging properties of the wind are however not related to the wind speed alone, but as well to the turbulence, gustiness, and directional constancy of the wind.

If such variables besides the wind speed are detected and taken into account, it will be possible to let the wind turbine operate at wind speeds considerably higher than 25 m/s if the wind is steady and thus less damaging, whereas it will be possible to stop the wind turbine at wind speeds below 25 m/s if the wind conditions are turbulent and gusty.

The term 'components of the turbine' is to be understood in a broad sense, including substructure, tower, nacelle, machinery, electrics, electronics, rotor with blades, etc.

The term 'exceeding predetermined values' is to be understood in a broad sense as well. Even if no proper limit value is defined, action may be taken according to the present invention if a variable attains a value deemed to be unfavourable or unsafe, or attains values in specific intervals deemed to be unfavourable or unsafe.

2. It is preferred that the direction of the wind relative to the horizontal direction of the main shaft of the turbine is sensed by a wind vane on the nacelle of the wind turbine.

3. It is further preferred that the turbulence of the wind is derived from the reading of an anemometer sensing the wind speed and preferably mounted on the nacelle of the wind turbine.

These embodiments imply simple and thus reliable methods of measuring, yet they provide relatively short response times and sufficient degrees of accuracy.

4. In one preferred embodiment, sensors such as strain gauges mounted on the blades sense bending forces acting on the blades or resulting bending levels of the blades.

5. In another preferred embodiment, sensors such as accelerometers mounted in one or more of the blades sense movements of the respective blade(s).

These methods constitute alternative embodiments of a preferred method according to the invention, where the state of and actions on the blades of the wind turbine are used as a controlling parameter.

6. Signals from the sensors mounted on a blade are preferably recorded together with information on the momentary angular position of that blade.

Such recording forms the basis of deriving information on directional or angular phenomena acting on the rotor of the wind turbine. Such phenomena comprise wind irregularities, such as wind shear (different velocity at different altitudes), wind direction relative to the axis of rotation of the wind turbine main shaft, etc.

7. In this connexion, a horizontal or vertical direction of wind, or a combination thereof, is preferably derived from readings of the sensors mounted on the blades in dependency of the momentary angular position of each blade.

According to the invention, an oscillating action on a blade in dependency of the angular position of that blade may be interpreted as the action of wind coming from another direction than the axial direction (the straight-ahead direction). Thus, the direction of the wind may be derived from signals from sensors on one or more blades of the wind turbine, when correlated with the momentary angular position of each respective blade.

8. In one preferred embodiment, the turbulence of the wind is derived from readings of sensors mounted on the blades, preferably in dependency of the momentary angular position of each blade.

In this way, the turbulence of the wind will be measured for the greater part of, or the whole of, the area of the wind turbine rotor. It is evident that this will provide readings which give a more true picture of the turbulence-induced stresses on the wind turbine than turbulence readings from one single or very few places, e.g. from an anemometer on the nacelle.

9. Preferably, the activity of a pitch control system in the wind turbine is recorded and used for assessing properties of the wind, such as vertical and/or horizontal direction, or turbulence.

It is known in the art of controlling wind turbines, that a system controlling the pitch of each blade in the rotor may preferably be made with such fast response that the pitch of each blade may be brought into a desired value within a fraction of one revolution of the rotor.

With such a fast pitch control system, the activity of the system will, according to the invention, provide a picture of the wind speed and turbulence within any one sector of the circular area swept by the rotor.

According to the invention, this activity is recorded and/or analysed and thus providing a picture of wind speed and turbulence in various sectors, e.g. in various heights above the ground. Such recording or analysis is then used as the basis for deciding whether to reduce the speed of the rotor and/or the power of the generator.

10. In a preferred embodiment of the invention, the temperature of one or more components of the drive train and/or the generating system is monitored by temperature sensor(s).

By this measure, the turbine may be slowed down or its power output may be reduced in the case of elevated temperature(s) in the wind turbine machinery. Such elevated temperature may be caused by a technical failure, loss of oil, hot weather or similar conditions, and in most cases, the elevated temperature will induce undue stress in components of the wind turbine. Reducing speed and/or power according to the invention will reduce production of heat and thus reduce the temperature(s) in question.

11. In another preferred embodiment, the vibration of, or noise in, one or more components of the drive train and/or the generating system is monitored by acceleration or vibration sensor(s).

By this measure, the turbine may be slowed down or its power output may be reduced in the case of excessive noise or vibration in the wind turbine machinery. Such excessive noise or vibration may be caused by a technical failure, loss of oil, wear, fracture, or similar conditions. Reducing speed and/or power according to the invention will reduce the risk of further damage.

In a further development of this embodiment of the method of the invention, the noise or vibration pattern is analysed, and action taken in dependence of the result of the analysis. The wind turbine may e.g. be stopped if the noise or vibration level is increasing over time.

12. Preferably, vibration or movement of supporting structures such as the tower or its substructures are monitored by acceleration or vibration sensors.

Tower movements may i.a. be caused by excessive wind gusts or turbulence, and it is essential to reduce speed and/or power of the wind turbine during such conditions, in order to avoid overloading the mechanical parts of the wind turbine and to avoid unwanted oscillations in flexible components such as the blades.

13. It is preferred as well to analyse the vibrations or noise, respectively, to record properties such as frequency spectra, or vibration or noise levels.

In this way, valuable information is obtained as to response of the wind turbine components to various operating conditions or degrading, ageing and failure of components.

14. A method according to any preceding claim, wherein the output power of the generator is monitored by a power sensing system.

Monitoring the output power provides for a more precise and accurate control of the output power level by the control system according to the invention.

15. A method according to any preceding claim, wherein lateral movements of the tower or nacelle is sensed by one or more movement sensor(s), such as accelerometers or strain gauges.

Providing sensors for these movement detections enables tower or nacelle movement signals, respectively, to be fed to the control system according to the invention.

16. A method according to any preceding claim, wherein wind variables such as direction relative to the nacelle, speed and turbulence are assessed from data sensed by wind sensors on one or more of the blades, such as pitot tubes, hot film sensors, laser light sensors, or ultrasound sensors, sensing local wind data on the respective blade.

When such data are recorded together with information on the momentary angular position of each blade, the desired wind data may be derived from the recorded data by suitable computer processing. Wind data obtained this way may be more reliable than wind data obtained from sensors mounted on the nacelle, even specialised sensors.

The above-mentioned objective is further met in that the method of the invention is used for operating a wind turbine during weather conditions comprising: yaw error; high turbulence, wind speed, or gustiness; wind shear, upwind or downwind; wake from other turbine(s); or during mechanical or electrical conditions comprising: high vibration levels or high temperature in the turbine, high turbine loading, grid drops or faults or failures in the turbine.

In many events of failure, a wind turbine will still be safely and securely operable at reduced speed or reduced power, even if it is not operable at rated conditions. Thus, by utilising the method of the invention, it will be possible to operate a wind turbine while it is awaiting repair following a failure, or in case it is worn or aged. In this way, the turbine is still available and operable and thus able to generate power, so that the economical loss following a failure or a lower degree of operability will be reduced.

The above-mentioned objective is further met in that the method of the invention may be used for operating a wind turbine at wind speeds above 25 m/s.

In the prior art, it is generally considered inappropriate to operate a wind turbine at high wind speeds, such as above 25 m/s mean wind speed. However, this follows to a substantial degree from the increased risk of gusts and turbulence at high wind speeds, as a high wind speed per se will not necessarily be damaging to the turbine.

If the speed and power of the wind turbine are reduced according to the invention in a controlled manner, the detrimental loading from the speed, the gusts and the turbulence of the wind will be reduced to an acceptable level.

In particular, if the gustiness and turbulence of the high-speed wind are assessed as has been mentioned above, it will be possible to reduce the speed and/or power of the wind turbine just sufficient to achieve an acceptable level of detrimental loading, the reduction in speed and/or power being less than what would otherwise be necessary.

This implies that the speed and power of the wind turbine may continuously be kept as high as possible during weather conditions with high wind speed, gustiness, and/or turbulence. In particular, the speed and power may be maintained at considerably higher levels than in the prior art.

The objective is further met in that the method of the invention may be used for operating an offshore wind turbine during heavy sea.

Heavy sea conditions will most probably involve a high level of impact on the tower and the substructure of an off-shore wind turbine with consequent stress, movement and strain of the tower and substructure.

Operation of an off-shore wind turbine under such conditions will imply additional stress on both supporting and moving parts of the wind turbine. In particular, the moving parts will be additionally stressed due to the movements of the tower, and the tower will be additionally stressed due to the increased vibration level induced by the moving machinery.

Reducing speed and/or power according to the invention will decrease such detrimental effects on both tower and moving parts, and thus enable continued operation during heavy sea conditions. Thus, the turbine will still be available, despite with reduced energy production, during such weather conditions, enabling increased pay-back.

Still further, the objective is met in that a wind turbine:

comprising an electric generator for generating electricity and a control system for controlling at least pitch and yaw of the turbine and power output of the generator;

comprising one or more sensors connected to the control system for sensing variable(s); and comprising actuators controlled by the control system for adjusting at least pitch and yaw of the turbine, and a control circuit controlled by the control system for controlling at least the power output of the generator;

is characteristic in that:

the sensor(s) belong(s) to the group consisting of an external wind direction sensor and an external wind turbulence sensor, as well as any other sensor(s) mounted on component(s) of the turbine and sensing a state of that component.

21. It is preferred that the external wind direction sensor comprises a wind vane mounted on the nacelle of the wind turbine.

22. It is also preferred that the wind turbulence sensor comprises an anemometer mounted on the nacelle of the wind turbine.

23. It is preferred as well that the sensors comprise sensors such as strain gauges mounted on the blades for sensing bending forces acting on the blades or resulting bending levels of the blades.

24. In one embodiment the wind turbine comprises sensors such as accelerometers mounted in one or more of the blades for sensing movements of, or noise in, the respective blade(s), and/or sensors for sensing the momentary angular position of the rotor and thus of each blade.

By these measures, similar advantages are achieved as explained above with reference to the method claims, in that the wind turbine defined by the features just mentioned will be particularly suitable for working the respective embodiments of the method of the invention.

26. In a wind turbine comprising a pitch control system, it is according to the invention preferred that the pitch control system has transmitting facilities for transmitting the activity of the pitch control system, preferably for transmitting the momentary pitch of each blade, to a main control system.

Hereby, parameters derived from the activity of the pitch control system may be used as inputs to a control system utilising the method of the invention.

In general, activity of the pitch control system will reflect unsteady wind conditions, such as gustiness of wind. In more sophisticated pitch control systems, unsteady wind conditions such as turbulence or wind shear (different wind speed at different heights within the circle swept by the rotor) may be reflected in the activity of the pitch control system, and thus, a correspondingly higher degree of detail may be achieved in the control of the speed and/or power of the wind turbine according to the invention may be obtained.

27. It is preferred that the wind turbine comprises temperature sensor(s) for monitoring the temperature of one or more components of the drive train and/or the generating system.

28. It is further preferred that the wind turbine comprises acceleration or vibration sensor(s) for monitoring the vibration level of, or noise in, one or more components of the drive train and/or the generating system.

By these measures, the speed and/or power of the turbine may be reduced in the case of overheating of components or excess levels of vibration or noise in components. Such overheating may be caused by unfavourable combination of climate and operation parameters, whereas overheating in general, as well as vibration or noise may be caused by failure or breakdown in the wind turbine components in general.

29. It is generally preferred that the wind turbine comprises a power sensing system for sensing the output power of the generator.

30. Finally, it is preferred that the sensors comprise one or more movement sensor(s) such as accelerometers or strain gauges for sensing lateral movements of the tower. Such tower movements are mostly caused by rough weather conditions.

By these measures, similar advantages are achieved as explained above with reference to the method claims, in that the wind turbine defined by the features just mentioned will be particularly suitable for working the respective embodiments of the method of the invention.

In the following, embodiments of the invention will be explained in more detail with reference to the drawings, in which.

The major part of the loading of a wind turbine is caused by the effect of the relative wind speed on the blades. The load on the blades is generally defined by the lift force L and the drag force D, which are for any blade segment 1 illustrated in FIG. 1 and defined by:

$$L = \tfrac{1}{2}\rho W_R^2 C_L A$$

$$D = \tfrac{1}{2}\rho W_R^2 C_D A$$

where:

ρ is the air density $W_R$ is the wind velocity relative to the blade segment

A is the area of the blade segment $C_L$ is a dimensionless lift coefficient (dependent on the inflow angle α); and $C_D$ is a dimensionless drag coefficient (dependent on the inflow angle α)

Figure 1:
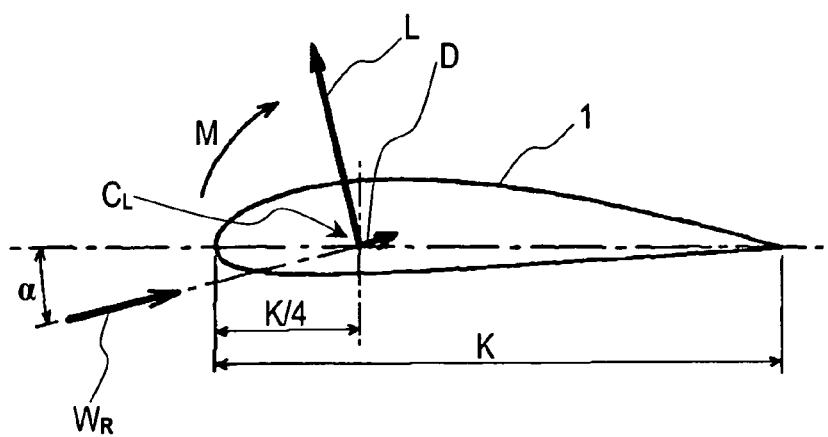
FIG. 1 shows the forces acting on a wind turbine blade segment.

The lift and drag forces L, D act along a virtual lift centre line extending along the front edge of the blade, and 25% of the blade width behind the front edge. In FIG. 1, the virtual line extends orthogonally to the plane of the paper and through the lift centre $C_L$.

For the illustrated profile of the blade segment 1, the lift centre $C_L$ is assumed to be situated ¼ of the chord length K behind the front edge of the profile, as designated by the reference K/4.

Figure 2:
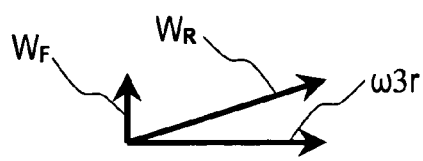
FIG. 2 shows the formation of the relative wind speed $W_R$.

The relative wind speed $W_L$ is a combination of the free wind speed $W_F$ and a virtual wind speed ω3 r, induced by the angular velocity ω of the rotor of the wind turbine and the radial distance r from the centre of the wind turbine rotor to the blade segment:

$$W_R = ((\omega\, r)^2 + W_F^2)^{1/2}$$

where:

(ω r) is the angular speed of the blade segment (the (ω r)-vector is oriented oppositely to the direction of movement of the wing segment); and $W_F$ is the free wind speed This relation is illustrated in FIG. 2

From the relations above, it appears that the forces loading the wind turbine are varying with the square of the wind speed; fluctuations in wind speed will thus give even higher fluctuations in force—and hence loading. Such fluctuations are critical as regards fatigue stress to the blades and to the wind turbine in general.

Therefore, the loading on the turbine can be reduced in an efficient manner by reducing the relative wind speed; in practice, this will be done by reducing the rotational speed of the rotor.

Variations in rotor speed will entail substantially greater variations in the relative wind speed $W_R$ than will variations in the free wind speed $W_F$, at least for the outer parts of the rotor blades.

However, by reducing the rotational speed of the rotor, the torque into the gearbox will be increased (power=torque× rotational speed) if the electrical output power of the generator is not reduced correspondingly.

According to the invention, therefore, the output power of the generator may be reduced, dependent on the reduction in rotor speed and the actual value of the torque into the gearbox, when the rotor speed is reduced in order to reduce loadings on the wind turbine in rough weather, or other unfavourable conditions.

It is essential that the wind turbine will continue its operation in rough weather conditions, in order to support the electricity supply grid. It is well known that a grid may collapse if large generators are suddenly decoupled from the grid.

For areas highly penetrated by wind power, the overall grid power can at high wind be supplied at 50-80% by means of wind power. The risk of such a grid collapsing is increased substantially if the wind turbines are of the prior art type, decoupling from the grid and stopping when a certain wind speed is exceeded.

In order that a grid having a high percentage of wind power generators shall not be in danger of collapsing in rough weather conditions with high wind speeds and wind gusts, the wind turbines may according to the invention be adapted to continue supplying power, even at quite large wind speeds.

This will be possible if the turbines are adapted to reduce rotor speed and generator power with the increase in wind speed above a predetermined level, which may be e.g. 25 m/s.

According to the invention, the rotor speed and the generator power are reduced to keep the various loads on the wind turbine components within safe limits.

Figure 3:
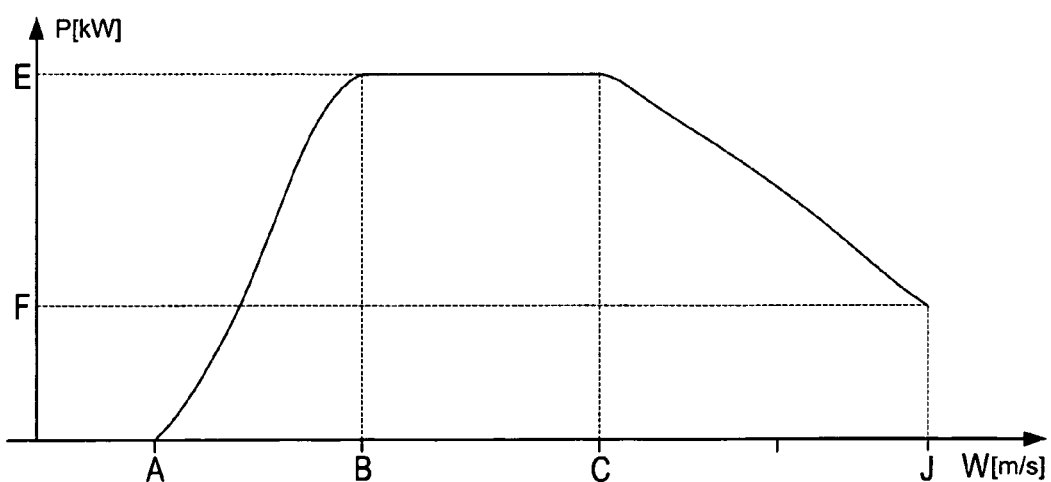
FIG. 3 shows reduction of the output power according to the invention, at high wind speeds.

FIG. 3 shows the relation between the wind speed W and the output power P of a wind turbine. At increasing wind speed W, the wind turbine starts to deliver electrical power at a starting wind speed A and reaches its rated output E at a rated wind speed B.

A wind turbine of the prior art will be designed with a maximum rated wind speed C, and if this wind speed is exceeded, the wind turbine will shut down, i.e. it will disconnect from the grid and brake to a standstill.

A wind turbine according to the present invention will reduce its output power P when the wind speed W exceeds the maximum rated wind speed C, in order to keep the loading of the wind turbine within safe limits, as has been disclosed above. If the wind speed W exceeds a maximum allowed wind speed J, the wind turbine according to the invention will shut down (i.e. disconnect and brake).

These features of the wind turbine of the invention implies that the wind turbine of the invention will be available at wind speeds between the limits C and J—contrary to the prior art wind turbines—and thus ensure continuous power production at these high wind speeds.

When the wind turbines eventually shut down at wind speeds exceeding limit J, they disconnect at a substantially lower power level F and thus at a much lower risk of grid collapse, because the wind power will constitute a much smaller fraction of the total grid power at this wind level.

Periods of non-availability of wind turbines of the present invention are of course much shorter than for wind turbines of the prior art, because the wind speed will exceed limit value J for a much shorter time than limit value C.

However, said periods of non-availability will be shorter for another reason as well: When a prior art wind turbine has been shut down at wind speed C, it cannot reconnect to the grid at the same wind speed because of the very high loading of the turbine at this wind speed level; typically, reconnection will occur when the wind speed has been lower than, say, C—25% for 30 min or more. To the contrary, a wind turbine according to the present invention will be able to reconnect at a wind speed of, say, J—10% because of the much lower power level F involved, and in particular because of the much lower rotor speed involved.

According to the invention, the reduction of the generator power at wind speeds above limit C may be increased in response to other variable(s) (besides the wind speed) exceeding limit values, or an unfavourable situation occurring.

Figure 4:
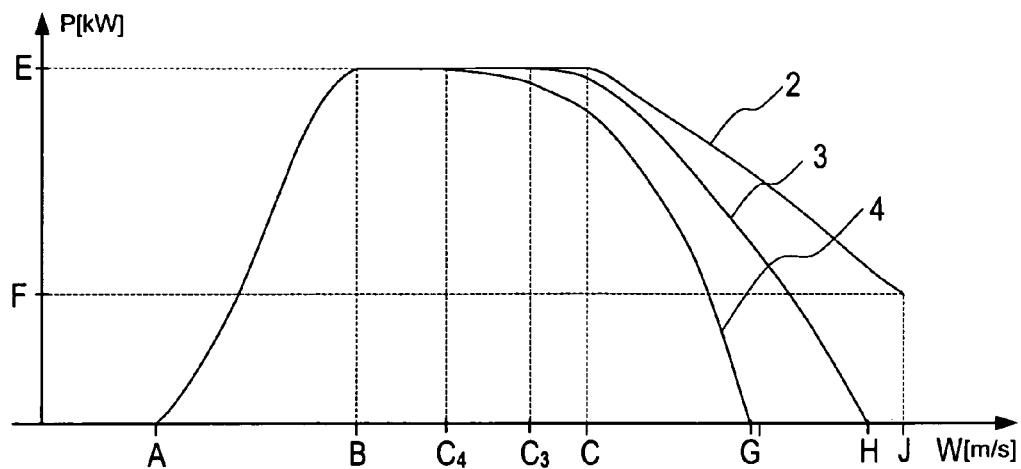
FIG. 4 shows reduction of the output power according to the invention, at high wind speeds together with high levels of other variables.

This strategy is illustrated in FIG. 4. The output power P of the generator of the wind turbine is being reduced for wind speeds W above the limit value C, as mentioned with reference to FIG. 3; this reduction is illustrated by the curve 2.

The curve 3 illustrates the situation where another unfavourable situation is present; this might e.g. be high wind turbulence. The wind turbine will not be able to operate at full rated power up to wind speed C, because a high wind turbulence will, as it has been explained above, put additional stresses to the wind turbine. Therefore, the generator power will have to be reduced as from a lower wind speed, in the illustrated case from the wind speed $C_3$. If the wind speed reaches the value H while having the same turbulence, the turbine will have to be stopped.

The curve 4 applies to a situation where an increased temperature has been observed in the wind turbine machinery. In this case, the generator power will have to be decreased as from the wind speed $C_4$, and the turbine will have to be stopped at the wind speed H.

If a high temperature is detected at a bearing, if an up-flow situation or a yaw error occurs, or if the blade loading becomes to high, etc., the turbine output power (the generator power) will be reduced in a similar fashion by the wind turbine's control system according to the present invention.

If the blade loading in terms of mean load or equivalent loads (found by the statistical methods of rain flow counting or standard deviation) is exceeding a predetermined threshold limit, momentarily or for any particular period of time, the turbine is too heavily loaded. The rotor speed and/or the generator power should hence be reduced according to the invention, in order to decrease the loading to be within safe limits.

Figure 5:
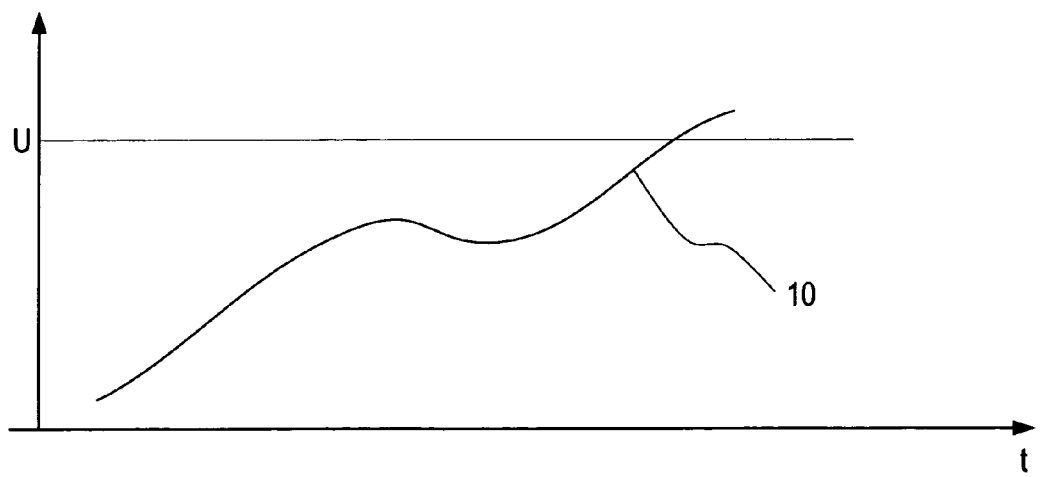
FIG. 5 illustrates monitoring of blade loading.

A typical situation is shown in FIG. 5. It appears that a blade loading 10 is monitored continuously and that the loading exceeds a predetermined limit U at a certain point of time. When this occurs, the rotor speed and/or the generator power of the wind turbine are reduced according to the invention.

Figure 6:
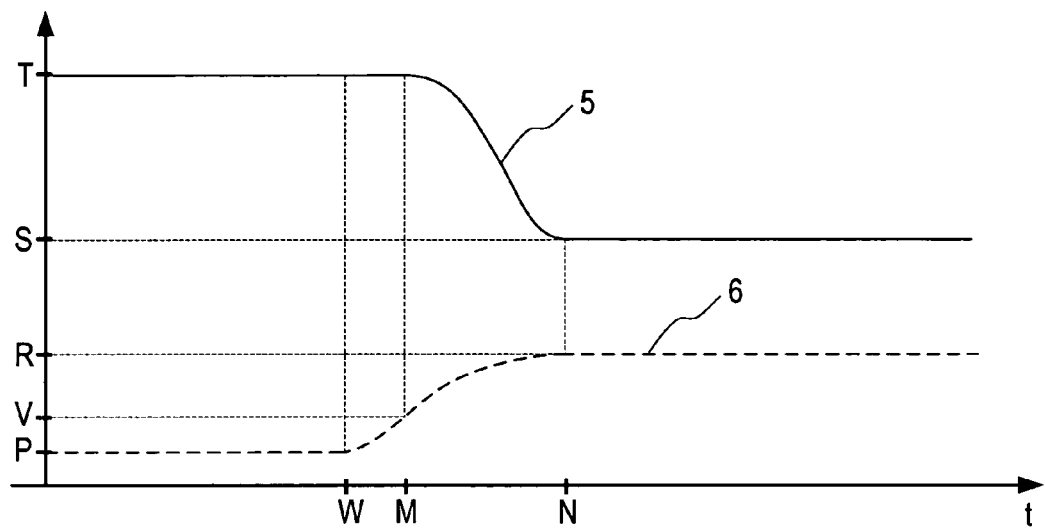
FIG. 6 shows reduction of output power at an event of increased yaw angle.
Figure 7:
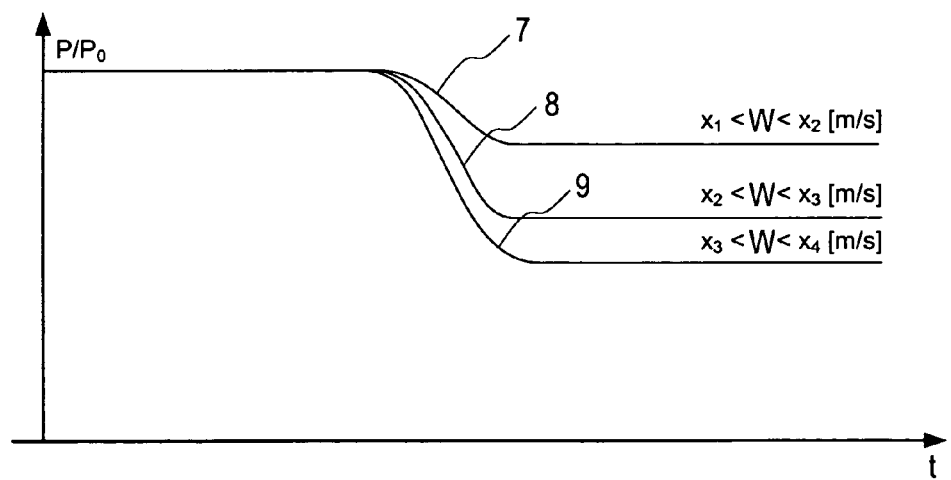
FIG. 7 shows reduction of output power at an event of increased yaw angle in different wind speed intervals.

FIGS. 6-7 illustrate the behaviour over time of a control system of the present invention when a yaw error occurs. The abscissa corresponds to the time t and the ordinate to the yaw error 6 (angle) and the output power 5, respectively.

During a yaw error condition, the horizontal direction of wind is not properly aligned with the horizontal direction of the main shaft of the wind turbine. The available yawing speed of a wind turbine is very low, often around 0.5 deg/sec, and a yaw error thus occurs when the direction of wind changes at a rate greater than the available yaw speed (greater than 0.5 deg/sec).

In FIG. 6, the yaw error is initially at a low level P; this may e.g. be an allowed level, that is, a small yaw error which will not initiate yawing of the wind turbine to eliminate the error.

At the time W, the direction of wind starts to change, and the yaw error increases, until it at the time M attains the level V, which is the maximum allowable yaw error at full rated power T.

As the yaw error increases, a yaw control system acts to eliminate the yaw error by yawing the wind turbine. The increasing yaw error shown in FIG. 6 is thus a difference between the change of direction of the wind and the change in yaw angle effected by the yaw control system.

As the yaw error 6 increases above the level V, the output power 5 of the wind turbine will have to be decreased in order to keep the stresses within safe limits; this is effected by means of a power control system commanded by a general control system according to the invention.

At the time N, the yaw error 6 stabilises at a value R, as the difference between the wind direction and the yaw angle remains constant, presumably due to the rate of change of wind direction corresponding to the maximum yawing speed of the turbine. Correspondingly, the output power 5 is kept at a corresponding, constant level S.

According to the invention, the reduction of output power and/or rotor speed in response to changes in one variable (such as yaw error above) may be made dependent of the level of or changes in any other variable (such as wind speed above). In this way, the control system of the invention will be enabled to maximise the output power of the wind turbine for any combination of a number of variables, thus maximising the availability and energy production of a wind turbine far more than possible with the prior art.

For example, the amount of required reduction of output power and/or rotor speed as a function of the yaw error may be different in different wind speed ranges. At high wind speeds, a yaw error will be more stressing and hence the amount of reduction of output power and/or rotor speed should be adjusted according to the wind speed.

This is illustrated in FIG. 7, which exemplifies the reaction of a control system according to the present invention, to a yaw error situation developing over time correspondingly to that in FIG. 6.

When the wind speed W lies between the limits $x_1$ and $x_2$, the relative power level $P/P_0$ is reduced according to the curve 7. When the wind speed W lies between the limits $x_2$ and $x_3$, the relative power level $P/P_0$ is reduced according to the curve 8, and when the wind speed W lies between the limits $x_3$ and $x_4$, the relative power level $P/P_0$ is reduced according to the curve 9.

Figure 8:
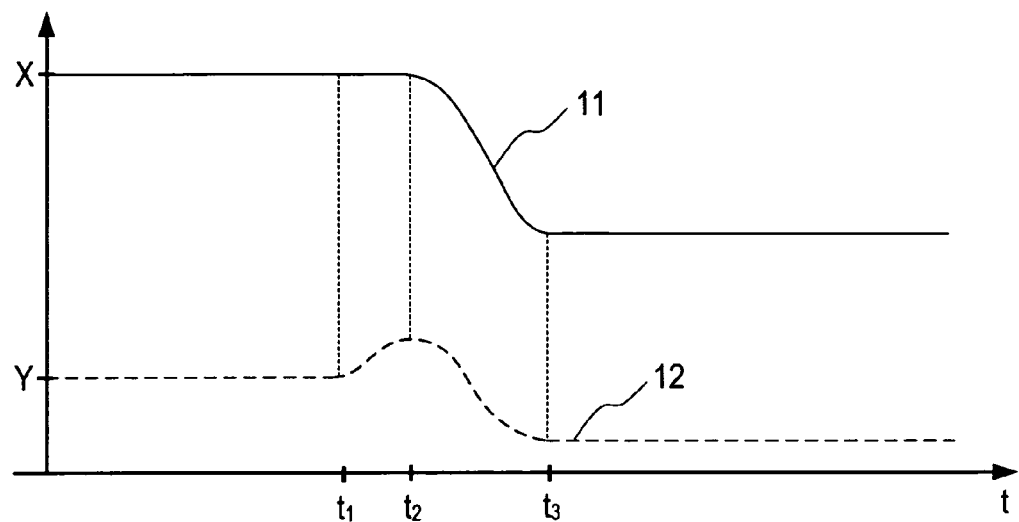
FIG. 8 shows reduction of output power and/or rotor speed at an event of increased blade deflection.

In FIG. 8, the response to an increase in rotor blade deflection over time is illustrated for a control system of the invention.

Initially, the deflection 12 of one or more rotor blades is at a safe level Y. At the time $t_1$, the blade deflection 12 begins to increase, reaching a predetermined level at the time $t_2$. At this time $t_1$, the output power 11 will begin to be reduced, following commands from the control system according to the invention.

The blade deflection will decrease with decreasing output power and consequential decreasing rotor torque.

The control system continues to command reduction in power level, until the blade deflection level is at a safe level which is lower than the normally acceptable level Y; this is done because the sudden increase in blade deflection level at time $t_1$ may be due to some blade defect and thus, continued operation at rated power level is considered unsafe in this embodiment example.

Many other variables than blade deflection may be reacted to in the manner illustrated in FIG. 8.

Figure 9:
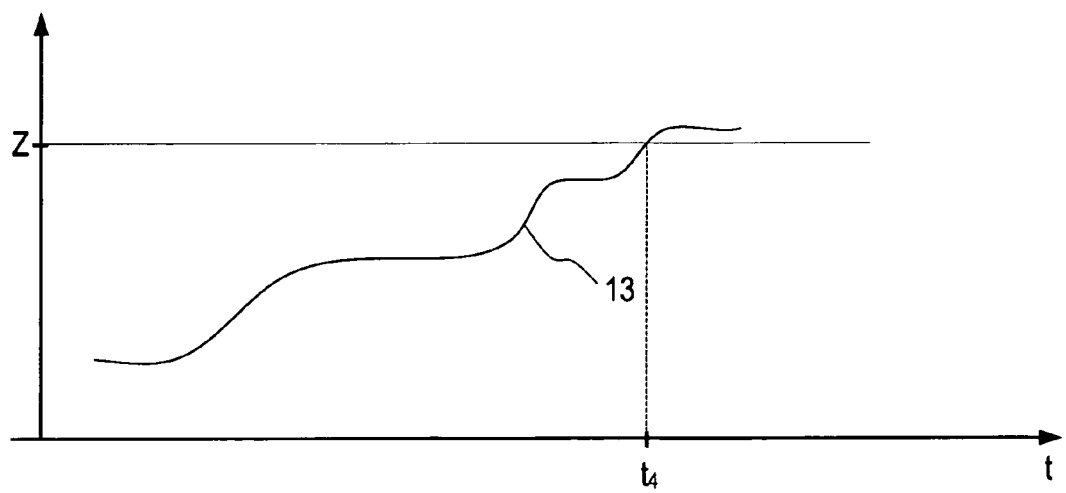
FIG. 9 illustrates the monitoring of component acceleration.

In FIG. 9, the development of the acceleration level 13 of a component in a wind turbine is illustrated. The component is e.g. being monitored by an accelerometer, mounted on the component in question and connected to the control system of the invention.

It appears from FIG. 9 that the acceleration level 13 is increasing over time, until it eventually exceeds a predetermined limit value Z. This event will trig the control system according to the invention and initiate a reduction of output power and/or rotor speed.

A form of irreversibility like the one described with reference to FIG. 8 may very well be incorporated into the control strategy of the control system of the invention, so that the system will not allow return to rated power or rated speed level until inspection has been carried out by service personnel.

The invention claimed is:

1. An operating method for a wind turbine which comprises a wind vane and an anemometer located at a nacelle of the wind turbine; a group of sensors selected from the group of strain gauges, accelerometers, pilot tubes, hot film sensors, and laser light or ultrasound sensors assembled on one or various blades; at least one of temperature, acceleration, and vibration sensors located on at least one of a drive train and a generator; acceleration, movement, or vibration sensors located on at least one of a tower of the wind turbine, its substructures, and the nacelle; and a system for measuring output power of the generator, the method comprising:

reducing at least one of the speed of a rotor and the power of the generator when wind impacts the wind turbine at a speed of more than 25 m/s or in swell conditions for offshore wind turbines, in response to a plurality of variables formed based on the wind direction in relation to the horizontal direction of a main wind turbine shaft and on the wind turbulence.

2. The operating method for a wind turbine according to claim 1, characterized in that signals from the sensors assembled on a blade are recorded together with the information relating to a current angular position of said blade.

3. The operating method for a wind turbine according to claim 1, characterized in that the horizontal or vertical direction of the wind, or a combination of both, and wind turbulences are derived from readings from the sensors assembled on the blades based on a current angular position of each blade.

4. The operating method for a wind turbine according to claim 1, characterized in that wind characteristics including at least one of the vertical direction, the horizontal direction, and turbulence are recorded and evaluated based on the activity of an air flow control system located on the wind turbine.

5. The operation method for a wind turbine according to claim 1, characterized in that vibrations or noise are analyzed in order to record properties including at least one of a frequency spectrum or vibration or noise levels.

6. The operation method for a wind turbine according to claim 1, characterized in that wind variables including at least one of the direction in relation to the nacelle, the speed, and the turbulence in the surroundings of a corresponding blade are evaluated.

7. The operation method for a wind turbine according to claim 1, characterized in that the method is used during atmospheric conditions including: yaw error; high turbulence or wind speed; wind shear, upwind, or downwind; wake from at least one other turbine; or during mechanical or electrical conditions including: high vibration levels or high temperature in the turbine, high turbine loads, grid drops or faults, or failures in the turbine.

* * * * *